(12) United States Patent
Salvador et al.

(10) Patent No.: US 9,218,806 B1
(45) Date of Patent: Dec. 22, 2015

(54) GENERATION AND USE OF MULTIPLE SPEECH PROCESSING TRANSFORMS

(71) Applicant: Amazon Technologies, Inc., Reno, NV (US)

(72) Inventors: Stan Weidner Salvador, Tega Cay, SC (US); Shengbin Yang, Natick, MA (US); Hugh Evan Secker-Walker, Newburyport, MA (US); Karthik Ramakrishnan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 13/892,167

(22) Filed: May 10, 2013

(51) Int. Cl.
*G10L 15/02* (2006.01)

(52) U.S. Cl.
CPC ..................................... *G10L 15/02* (2013.01)

(58) Field of Classification Search
CPC ....... G10L 15/26; G10L 25/00; G10L 15/065; G10L 15/22; G10L 15/063; G10L 15/20; G06Q 10/06; Y10S 707/99935; Y10S 707/99936
USPC ......... 704/243, 246, 248, 256, 234, 231, 247, 704/251, 252, 244, 245, 256.2, 200
See application file for complete search history.

(56) References Cited

U.S. PATENT DOCUMENTS

| | | | |
|---|---|---|---|
| 8,515,758 B2 * | 8/2013 | Huo | 704/256.2 |
| 8,996,372 B1 * | 3/2015 | Secker-Walker et al. | 704/244 |

\* cited by examiner

*Primary Examiner* — Charlotte M Baker
(74) *Attorney, Agent, or Firm* — Knobbe Martens Olson & Bear LLP

(57) ABSTRACT

Features are disclosed for selecting and using multiple transforms associated with a particular remote device for use in automatic speech recognition ("ASR"). Each transform may be based on statistics that have been generated from processing utterances that share some characteristic (e.g., acoustic characteristics, time frame within which the utterances where processed, etc.). When an utterance is received from the remote device, a particular transform or set of transforms may be selected for use in speech processing based on data obtained from the remote device, speech processing of a portion of the utterance, speech processing of prior utterances, etc. The transform or transforms used in processing the utterances may then be updated based on the results of the speech processing.

25 Claims, 6 Drawing Sheets

GENERATION AND USE OF MULTIPLE SPEECH PROCESSING TRANSFORMS

BACKGROUND

Computing devices can be used to process a user's spoken commands, requests, and other utterances into written transcriptions. In a common application, a user can speak into a microphone of a computing device, and an automated speech recognition module executing on the computing device can process the audio input and determine what the user said. Additional modules executing on the computing device can process the transcription of the utterance to determine what the user meant and/or perform some action based on the utterance.

Automated speech recognition systems typically include an acoustic model and a language model. The acoustic model is used to generate hypotheses regarding which subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

In some automated speech recognition systems, audio input of a user utterance is separated into time slices, referred to as frames (e.g., a frame=10 milliseconds of the utterance). Each of the frames is processed using statistical methods such that the frames more closely correspond to portions of the acoustic model. This process may be referred to as normalization. In many cases, after a preliminary transcript is generated, a second speech recognition pass is performed using other statistical methods selected to maximize the likelihood of an accurate transcription. For example, a transform, such as a full covariance constrained maximum likelihood linear regression ("cMLLR") transform may be generated or updated based on statistics from the processing of multiple utterances. The transform is used to further process the frames such that they more closely correspond to portions of the acoustic model. This process may be referred to as speaker adaptation.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
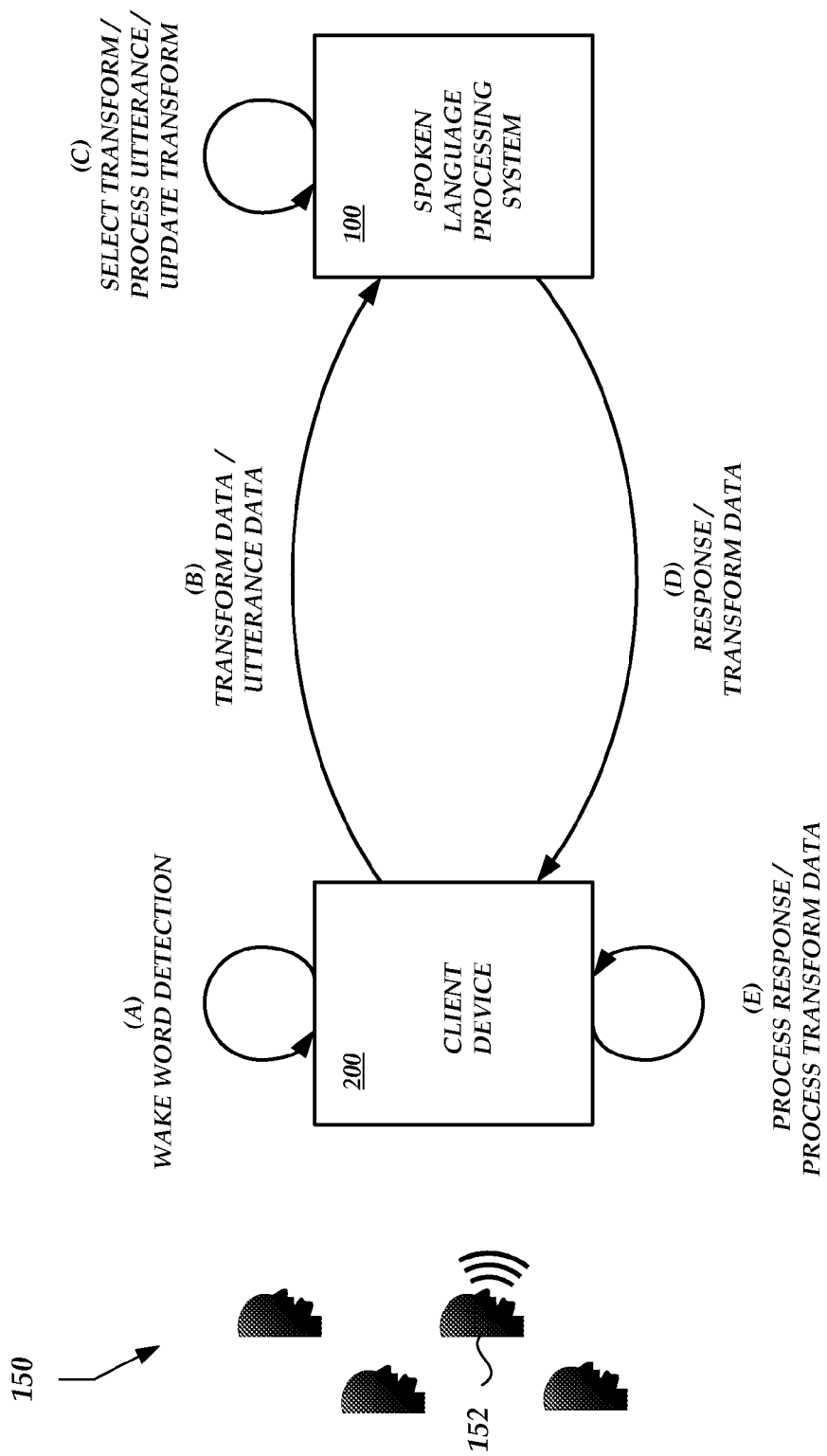
FIG. 1 is a block diagram of an illustrative network computing environment including a client device and a spoken language processing system in communication to process user utterances with one or more transforms.

Automatic speech recognition ("ASR") systems use various techniques to process a user utterance and generate one or more transcriptions of the utterance. Some ASR systems employ two processing passes. A first processing pass may be used to generate a preliminary transcription. A second processing pass can be performed using the generated transcription and constrained maximum likelihood linear regression ("cMLLR") transforms to generate a more accurate transcription. cMLLR aims to maximize the likelihood of a match or correspondence between input data (e.g., feature vectors computed from frames of user utterance audio data) and the acoustic model against which the input data is processed. In a typical application, transform matrices, also referred to simply as transforms, may be generated based on cMLLR statistics computed from the results of processing one or more utterances. The transforms are used to modify feature vectors in order to improve the correspondence between the utterance data and the acoustic model. A transform may substantially improve the correspondence between input data and an acoustic model when the transform is based on cMLLR statistics from previous utterances of the same user as the current utterance, or when the transform is otherwise based on utterances with similar acoustic properties as the currently processed utterance. A transform that is based on previous utterances of other users, however, may not provide such a substantial improvement and in some cases could produce less accurate results or otherwise negatively impact speech recognition processing.

Aspects of this disclosure relate to maintaining multiple transforms (e.g., full covariance cMLLR transforms) and intelligently identifying one or more of the transforms to use for processing of a particular utterance. Although the systems and methods described in the present disclosure will focus on generating, maintaining, and using multiple cMLLR transforms as the primary example, the disclosure is not limited to only cMLLR transforms. The present disclosure applies to any transform used in ASR, e.g.: linear discriminative analysis ("LDA") transforms; semi-tied covariance matrix or maximum linear likelihood transforms ("MLLT"); Cepstral mean and variance normalization; noise reduction transforms; etc.

A device that provides or uses ASR to process user utterances may be associated with multiple transforms. Particular transforms may be based on different cMLLR statistics than other transforms, and therefore may provide different ASR processing results. cMLLR statistics may be updated based on the processing of utterances. By updating different sets of cMLLR statistics based on the processing of different groups of utterances, any number of different transforms may be generated. For example, a transform may be generated for each regular user of a particular device, or for a group of users that are similar in some way, based on the processing of each individual user's utterances. The transform for a particular user may then be selected for use in ASR processing based on its performance in processing an utterance (e.g., its ability to modify feature vectors so that they more closely correspond to an acoustic model), rather than based on obtaining an explicit identification of the user. As a result, a transform targeted at a particular user may be automatically selected without first requiring the user to identify himself or herself. In some embodiments, the utterances of a particular user may not be explicitly associated with the user. Rather, similar utterances may be grouped together (e.g., utterances which have similar features or which otherwise may be optimally processed with a particular transform), and cMLLR statistics may be maintained for that group of utterances separately than some other group of utterances. As another example, transforms may be generated from cMLLR statistics obtained during the processing of groups of utterances within particular time frames. Illustratively, one transform may be generated for utterances that have been processed within a current ASR session, while another transform may be generated for all utterances regardless of time, etc.

Additional aspects of the disclosure relate to using multiple transforms to process a single utterance. As described above, a device may be associated with multiple transforms that are based on different sets of cMLLR statistics. Two or more transforms may be interpolated, and the interpolated transform may be used for processing the utterance. In some embodiments, the transforms may be interpolated according to interpolation weights such that aspects of one transform may outweigh corresponding aspects of another transform in the final interpolated transform. Illustratively, a device may be associated with a first transform based on all utterances that the device has processed in the previous week, month, year, etc, and a second transform based only on utterances that the device has processed during the current ASR session (e.g., a series of utterances within a short period of time). If the number of utterances in the current session (or the volume of cMLLR statistics available from processing those utterances) is relatively small, then the first transform may be weighted more in the interpolation of the transforms. If the number of utterances or volume of cMLLR statistics available from processing utterances in the current session is proportionally larger or exceeds some threshold, then the second transform may be weighted more in the interpolation process.

Further aspects of the disclosure relate to determining whether to update cMLLR statistics based on speech processing outcomes, such as whether the ASR processing produced accurate results or whether the user experience is satisfactory. Illustratively, if the user is experiencing poor results attributable to the ASR processing of particular utterances, then cMLLR statistics and/or transforms may not be updated based on the processing of those particular utterances. As another example, the processing results obtained from processing those particular utterances may be weighted less or otherwise discounted when updating or accumulating cMLLR statistics for particular transforms.

Aspects of the embodiments described in the disclosure will focus, for the purpose of illustration, on a client device that transmits data to a networked spoken language processing system for processing. However, the systems and techniques described herein may be implemented on a single device, such as a device that both receives spoken input and processes the input to determine the content of the user's utterance. Various aspects of the disclosure will now be described with regard to certain examples and embodiments, which are intended to illustrate but not limit the disclosure.

With reference to an illustrative embodiment, FIG. 1 shows a speech processing environment that includes a client device 200 in communication with a spoken language processing system 100. Users 150 may issue spoken commands, requests, and other utterances to the client device 200. The client device 200 can transmit audio of an utterance, or data regarding the utterance, to the spoken language processing system 100 via a communication network, and the spoken language processing system 100 can process the utterance and return a result or perform some action. In some embodiments, the client device 200 or one or more users 150 thereof may be associated with a particular spoken language processing system 100, or the client device 200 may be configured to transmit utterance data to any number of different spoken language processing systems 100. In some embodiments, the features described herein as being provided by the spoken language processing system 100 may be wholly or partially provided by the client device 200 or some other system or component.

As illustrated at (A), the client device 200 may be configured to identify when a user 152 speaks a particular key word that indicates that the user is addressing the client device 200 rather than, e.g., other users 150. A user 152 may use such a key word, also known as a "wake word," to address the client device 200 and indicate that a spoken command will follow. In this way, the wake word may be a verbal command indicator. The client device 200 need not be controlled via some onboard, wired, or wireless input device, but rather may be activated and controlled through spoken commands without any non-verbal indication that a spoken command is coming. For example, the client device 200 may "listen" to all available audio, and perform some ASR processing to determine when a key word, wake word, or command identifier is spoken. When a user 152 speaks a wake word and issues a spoken command to the client device 200, the client device 200 can recognize that the wake word was spoken, and transmit the audio of the wake word and/or the subsequently spoken command to the spoken language processing system 100 for processing. One example of a system for wake word identification and processing is disclosed in U.S. patent application Ser. No. 13/711,510, filed on Dec. 11, 2012 and incorporated herein by reference for all that it discloses.

The client device 200 may perform speech recognition on the wake word and then send an audio stream comprising the wake word audio and/or subsequent command audio to the spoken language processing system 100 at (B). In addition, the client device 200 may send beginning and ending time indexes for the wake word, alignments from wake word recognition, and other ASR data to the spoken language processing system 100 at (B). As described below, the spoken language processing system 100 can use the wake word audio, alignments, and other data to select, use, and update a transform.

In some embodiments, the client device 200 may store a set of transforms for use in speech processing. For example, the client device 200 may store a predetermined number of separate transforms (e.g., four), with each transform based on separate cMLLR statistics obtained through processing utterances from one of the four separate users 150. In addition, the client device 200 may store a default transform that may provide better results for an unknown user (e.g., a fifth user, not shown) than one of the four customized transforms. When a spoken command is obtained, the client device 200 may determine which transform will provide best ASR results, and then transmit the transform or an identifier thereof to the spoken language processing system 100 at (B) along with audio of the user utterance. For example, the client device 200 may recognize a wake word and, using alignments generated from wake word recognition, perform parallel speaker and environmental adaptation (also known simply as adaptation) on the wake word audio data. The client device 200 can then determine which transform is expected to provide the best results (e.g., which transform maximizes the cMLLR objective function for the current frames of audio data).

As described above, the client device 200 may be configured to "listen" to a substantial amount of audio from the users 150 in order to be available when a spoken command is issued (e.g., the client device may obtain and process audio 24 hours per day, or during scheduled times, or when it is powered on, etc.). The client device 200 may update one or more of the transforms based on audio data that is not transmitted to the spoken language processing system 100. For example, the client device 200 may update cMLLR statistics based on ASR processing of all utterances, or some subset thereof, that the client device 200 processes to determine whether a wake word or other spoken command is uttered. The client device 200 may then update a corresponding transform. Because the client device 200 may have access to substantially more audio than the spoken language processing system 100 with which to update transforms (e.g., perform speaker adaptation), the client device 200 may maintain more useful or accurate transforms than the spoken language processing system 100. In addition, the data size of the transforms is relatively small compared to the data size of the audio that is transmitted to the spoken language processing system 100. Therefore, the client device 200 may transmit the best transform for the current utterance (or multiple transforms, such as the n-best transforms where n is some integer) to the spoken language processing system 100 in addition to the utterance audio without substantially increasing the total transmission time. For example, the client device 200 may transmit the transform in the same data stream (e.g., before, after, or interleaved with utterance audio), in a parallel data stream, etc. In some embodiments, the client device 200 may update a transform while not processing wake-word audio (e.g., off-line processing).

At (C), the spoken language processing system 100 may process the utterance received from the client device 200. If the client device 200 transmitted one or more transforms, the spoken language processing system 100 may use one or more of the received transforms to process the utterance. In some embodiments, as described above, the spoken language processing system 100 receives data regarding the transform or other ASR data from the client device 200 instead of, or in addition to, a transform. In such cases, the spoken language processing system 100 can select a transform to use based on the data. For example, the spoken language processing system 100 may have access to a data store of transforms associated with the client device 200. In a manner similar that described above with respect to the client device 200, the spoken language processing system 100 may maintain several transforms tied to separate speakers or to distinct groups of prior utterances. The spoken language processing system 100 may also have access to a default or global transform for the particular client device 200, some group of client devices, or all client devices. The spoken language processing system 100 may process wake word audio (e.g., perform speaker adaptation) with one or more transforms from the data store based on alignments or other ASR data received from the client device 200. The spoken language processing system 100 can select a transform to use in processing the utterance based on which transform produces the best results (e.g., the transform that was used to modify feature vectors such that they most closely correspond to the acoustic model). The spoken language processing system 100 can also update the transform based on the results from processing the wake word and/or the utterance.

The number of transforms maintained for a client device 200 may be pruned for several reasons, such as to limit the amount of processing associated with the selection of a transform, to ensure that the transforms that are maintained are based on a sufficient amount of utterance data, etc. Illustratively one transform may be discarded and, in some cases, replaced by another transform that is expected to produce better results. If the default or global transform is selected as the best transform for use in processing the current utterance, the least recently used transform (e.g., one of the transforms tied to a speaker or group of utterances) may be discarded. In its place, an updated or modified version of the default transform may be generated and associated with the client device 200. This process is described in detail below with respect to FIG. 5.

In some embodiments, the spoken language processing system 100 may be configured to generate an ASR result quickly so that a response may be sent back to the client device 200 or some other action may be performed with relatively little delay. In such cases, the spoken language processing system 100 may be configured to select a transform based on data received from the client device 200, or to use a transform received from the client device 200, to perform ASR on the utterance and generate a result while minimizing any processing delay. Subsequently, or in parallel, the spoken language processing system 100 can perform speaker adaptation on some or all of the utterance audio data to identify the best transform for the utterance, and then update that transform. The updated transform can then be used to process a subsequent utterance.

At (D), the spoken language processing system 100 can transmit a response or processing result to the client device 200. The spoken language processing system 100 may also transmit an updated transform or data regarding an updated transform that may be used by the client device 200 to improve ASR processing of wake word audio and/or other audio.

At (E), the client device 200 can process the response received from the spoken language processing system 100. For example, the client device may present synthesized speech, play audio or video content, or perform some other action. In addition, the client device 200 can process any transform data received at (D). If the transform data includes an updated transform, the client device 200 can store the updated transform for use in processing future utterances. If the updated transform is based on the default or global transform, then the client device 200 can discard the least recently used transform and replace it with the transform received at (D). In some embodiments, rather than discarding the least recently used transform, the least used transform overall (or over some period of time) may be discarded and replaced with the modified default transform.

Figure 2:
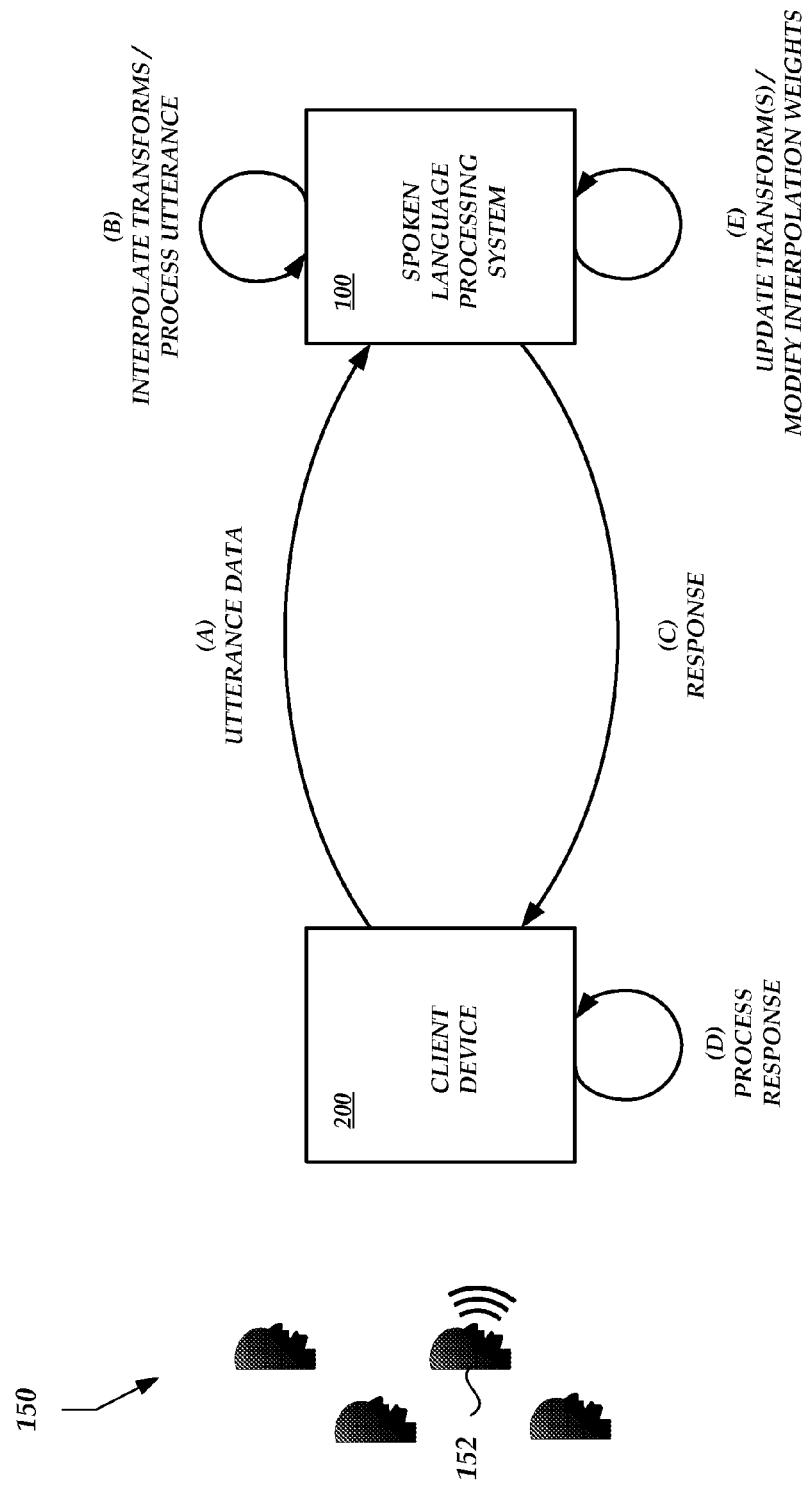
FIG. 2 is a block diagram of an illustrative network computing environment including a client device and a spoken language processing system in communication to process user utterances with interpolated transforms.

FIG. 2 illustrates another embodiment of a speech processing environment that includes a client device 200 in communication with a spoken language processing system 100. As with the speech processing environment described above and illustrated in FIG. 1, users 150 may issue spoken commands, requests, and other utterances to the client device 200, which can transmit audio of an utterance, or data regarding the utterance, to the spoken language processing system 100 via a communication network. The spoken language processing system 100 can process the utterance and return a result or perform some action. However, rather than selecting one of multiple transforms that are tied to a particular user or set of utterances, ASR processing can be performed with interpolated transforms. The multiple transforms that are interpolated may be based on particular time-based sets of utterances. For example, a first transform may be based on statistics computed from processing all utterances received by the client device 200. Such a transform may be referred to as a device transform. The device transform can compensate for the relatively small number of speakers and noise environment encountered by the device in the past. A second transform may be based on statistics computed from processing only those utterances received in the current session (e.g., received within a threshold period of time, such as several minutes). Such a transform may be referred to as a session transform. The session transform can compensate for what is likely a single speaker. The two transforms may be interpolated according to interpolation weights that can vary depending upon the data available (e.g., if few utterances have been received in the last several minutes, then the first transform may be assigned a much higher interpolation weight than the second transform).

At (A), the client device 200 can transmit utterance data (e.g., an audio stream) to the spoken language processing system 100. At (B), the spoken language processing system 100 can interpolate two or more transforms and process the utterance. One process for interpolating transforms and using interpolated transforms is described in detail below with respect to FIG. 6.

Illustratively, in order to provide results quickly, the spoken language processing system 100 may interpolate the transforms based on previously determined interpolation weights, and then update the interpolation weights at some point in time (E) subsequent to processing the utterance. For example, the spoken language processing system 100 may determine whether any utterances have been received from the client device 200 within a particular time period (e.g., several minutes). If not, a transform based on utterances processed before that threshold may be used. However, if an utterance has been processed within the time period, then the interpolation weights determined after processing that utterance may be used. In such cases, a transform based on utterances processed within the time period is interpolated with another transform.

In some embodiments, a transform based at least partly on the most recently processed utterance or utterances may be interpolated with a transform based on a comparatively larger set of utterances, even if no utterances have been processed within threshold period of time. In such cases, the interpolation weight used for the transform may be reduced based at least partly on the amount of time since an utterance was last processed.

The spoken language processing system 100 can transmit a response to the client device 200 at (C). Illustratively, the response may be synthesized speech, content, an executable command, confirmation of an action taken, etc. The client device 200 may process the response at (D), such as by presenting synthesize speech or content, notifying a user of an action taken, etc.

At (E), the spoken language system 100 can update one or more transforms and modify interpolation weights for the transforms. One process for interpolating transforms and using interpolated transforms is described in detail below with respect to FIG. 6. In some embodiments, the spoken language processing system 100 can perform the tasks at event (E) in parallel with events (C) and/or (D). In some embodiments, the spoken language processing system 100 can re-run speech recognition on the current utterance using the updated interpolation weights.

System Components

Figure 3:
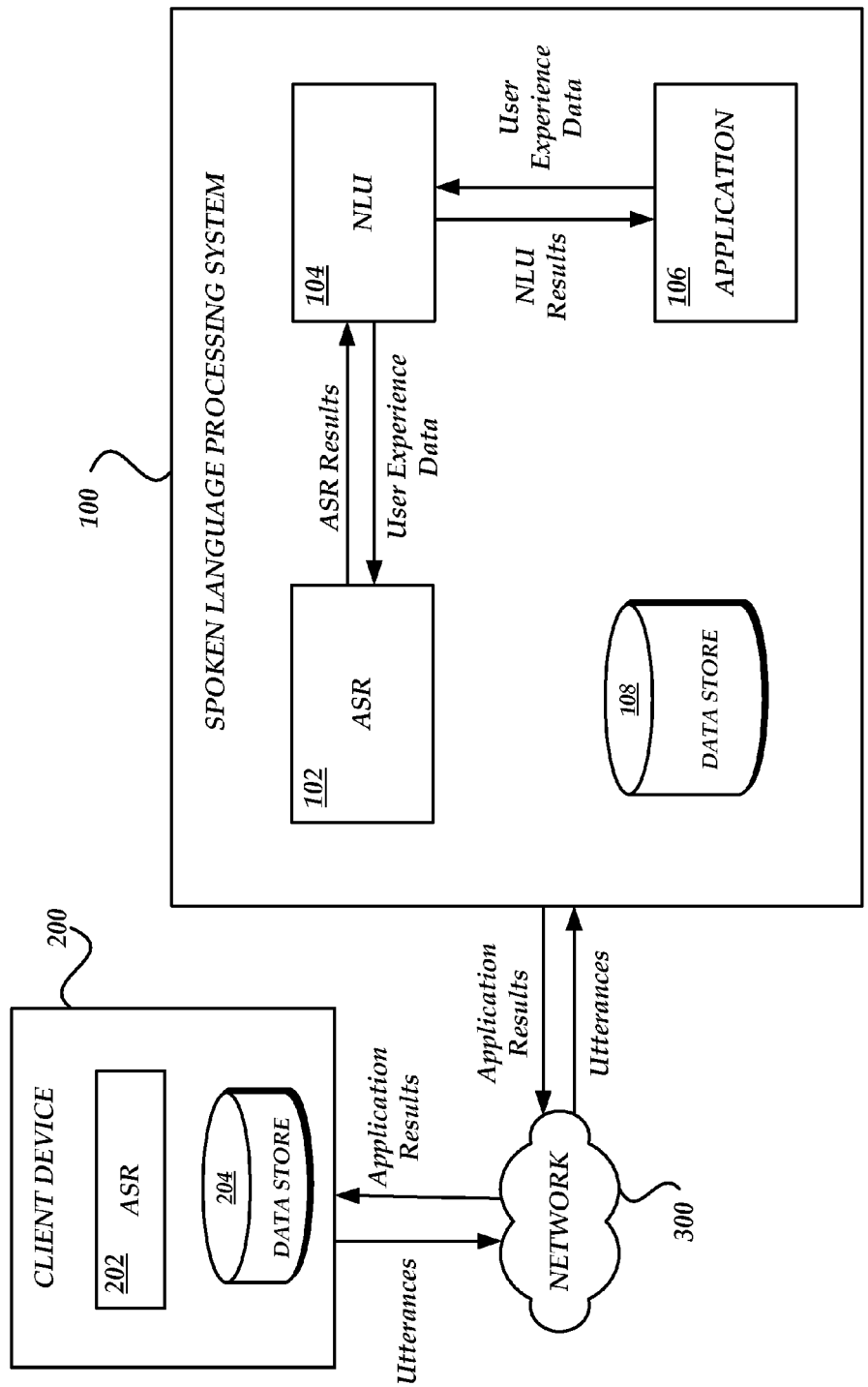
FIG. 3 is a block diagram of an illustrative network computing environment including a client device and a spoken language processing system configured to process user utterances with one or more of multiple transforms associated with the client device.

FIG. 3 shows various components of an illustrative spoken language processing system 100 and an illustrative client device 200. The spoken language processing system 100 and client device 200 may communicate via a communication network 300 to exchange information (utterance data, application results, etc.) related to the processing of user utterances and actions taken in response thereto.

The communication network 300 may be any wired network, wireless network, or combination thereof. In addition, the network 300 may be a personal area network, local area network, wide area network, cable network, satellite network, cellular telephone network, or combination thereof. For example, the communication network 300 may be a publicly accessible network of linked networks, possibly operated by various distinct parties, such as the Internet. In some embodiments, the communication network 300 may be a private or semi-private network, such as a corporate or university intranet. The communication network 300 may include one or more wireless networks, such as a Global System for Mobile Communications ("GSM") network, a Code Division Multiple Access ("CDMA") network, a Long Term Evolution ("LTE") network, or some other type of wireless network. Protocols and components for communicating via the Internet or any of the other aforementioned types of communication networks are well known to those skilled in the art of computer communications and thus need not be described in more detail herein.

The client device 200 can correspond to a wide variety of electronic devices. In some embodiments, the client device 200 may be a computing device that includes one or more processors and a memory which may contain software applications executed by the processors. The client device 200 may include a microphone or other audio input component for accepting speech input on which to perform speech recognition. The software of the client device 200 may include components for establishing communications over wireless communication networks or directly with other computing devices. Illustratively, the client device 200 may be a mobile device, such as a mobile phone, personal digital assistant ("PDA"), mobile gaming device, media player, electronic book reader, tablet computer, laptop computer, or the like. In some embodiments, the client device 200 may be a substantially stationary device, such as a television with program execution capabilities and network connectivity (a "smart TV"), set-top box, gaming console, home entertainment system, desktop computer, server computer, or the like.

The spoken language processing system 100 may correspond to a logical association of one or more computing devices configured to provide automatic speech recognition and other computing services to user devices 200 and other entities. The spoken language processing system 100 can include an ASR module 102, a natural language understanding ("NLU") module 104, any number of application modules 106, and a data store 108. In some embodiments, the spoken language processing system 100 may include additional or fewer modules or components than illustrated in FIG. 3. For example, a spoken language processing system 100 may not include an NLU module 105 or application modules 106.

In some embodiments, the features and services provided by the spoken language processing system 100 may be implemented as web services consumable via a communication network 300. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The ASR module 102 can receive and process audio input. For example, the ASR module 102 may receive audio input from a client device 200, access one or more transforms in a data store 108, and process the audio input to generate ASR results (e.g., n-best transcriptions of a user utterance). The output of the ASR module 102 may be provided to an NLU module 105 to interpret the output and/or determine the user's intent. Various applications 106 can use the output of the NLU module 104 to respond to user utterances or take actions in response to user utterances. Separate applications 106 may be implemented within the spoken language processing system 100 to perform different tasks. For example, the spoken language processing system 100 may include separate applications 106 for playing music, providing directions, performing searches, purchasing products, providing personal information management (e.g., calendars or contacts) and the like.

In some embodiments, an application 106, NLU module 104, or some other component or module may generate or capture information regarding ASR processing outcomes (e.g., data regarding the user experience as it relates to the processed utterance), and provide that information to the ASR module 102. Determining whether the user experience is satisfactory can be based on whether the user has repeated an utterance (indicating that the previous result may have been based on an incorrect interpretation of what the user said), the tone of the user's voice, user complaints, specific input from a user regarding the user's experience or the accuracy of the results, etc.

The ASR module 102 can then use the user experience information to determine whether or not to modify a transform (or update cMLLR statistics that may be used to modify a transform) based on ASR processing of the utterance. For example, if the user experience with a response to a particular utterance or group of utterances is poor, then the ASR module 102 may be informed of the poor experience or instructed not to update the statistics or the transform based on the processing results from the particular utterance(s). In this way, the ASR module 102 can avoid potentially reducing the accuracy or usefulness of a transform, as might otherwise occur if the transform was updated based on statistics from unsatisfactory ASR processing. In some embodiments, rather than providing information about the user experience or other processing outcomes, the NLU module 104, application 106, and/or some other component may expose an argument or switch to the ASR module 102. The argument may simply indicate whether the ASR module 102 should update a transform based on processing of the current utterance, the previous n utterances, etc. In some embodiments, updating transforms may occur offline or asynchronously, and any utterances associated with unsatisfactory user experiences may be excluded from the process.

Process for Maintaining and Using Multiple Transforms

Figure 4:
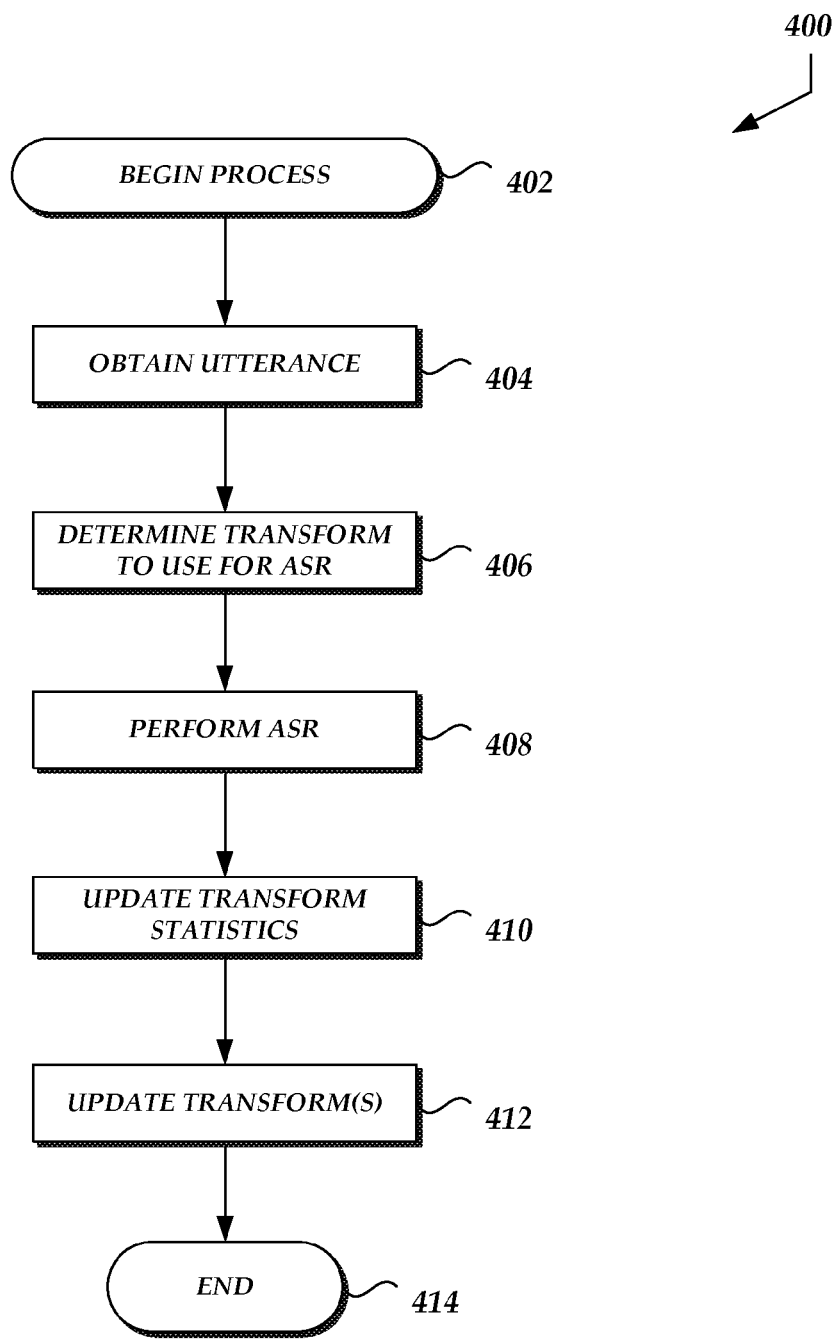
FIG. 4 is a flow diagram of an illustrative process for processing a user utterance with one or more of a set of transforms associated with a client device.

With reference now to FIG. 4, a sample process 400 for maintaining and using multiple transforms for ASR processing will be described. Advantageously, multiple transforms may be maintained based on various parameters (e.g., speakers, acoustic similarities between utterances, timeframes, etc.). The transform that is most likely to produce accurate results, or multiple transforms that may be interpolated to produce accurate results, may be dynamically determined (e.g., on an utterance-by-utterance or session-by-session basis).

The process 400 begins at block 402. The process 400 may begin automatically upon initiation of a speech recognition session. For example, the process 400 may begin when a client device 200 establishes a speech recognition session with a spoken language processing system 100, upon receipt of an utterance by a spoken language processing system 100, etc. The process 400 may be embodied in a set of executable program instructions stored on a computer-readable medium, such as one or more disk drives, of a computing device associated with the spoken language processing system 100. When the process 400 is initiated, the executable program instructions can be loaded into memory of a computing device and executed by one or more processors in communication therewith.

At block 404, the ASR module 102 or some other module or component of the spoken language processing system 100 can receive audio input from a client device 200. The audio input may be a real-time or substantially real-time audio stream of a user utterance. For example, a user 152 may begin speaking into a microphone or other audio input of the client device 200, and audio of the utterance may be transmitted to the spoken language processing system 100 in substantially real time. In some embodiments, the audio may not be a real-time stream of audio, but rather may be a stream of previously recorded audio. In addition to audio data of the user utterance, the client device 200 may transmit other data, such as time indexes and/or alignments of a wake word if the client device 200 is configured to perform wake word recognition, transforms or transform selection data, and the like.

Figure 5:
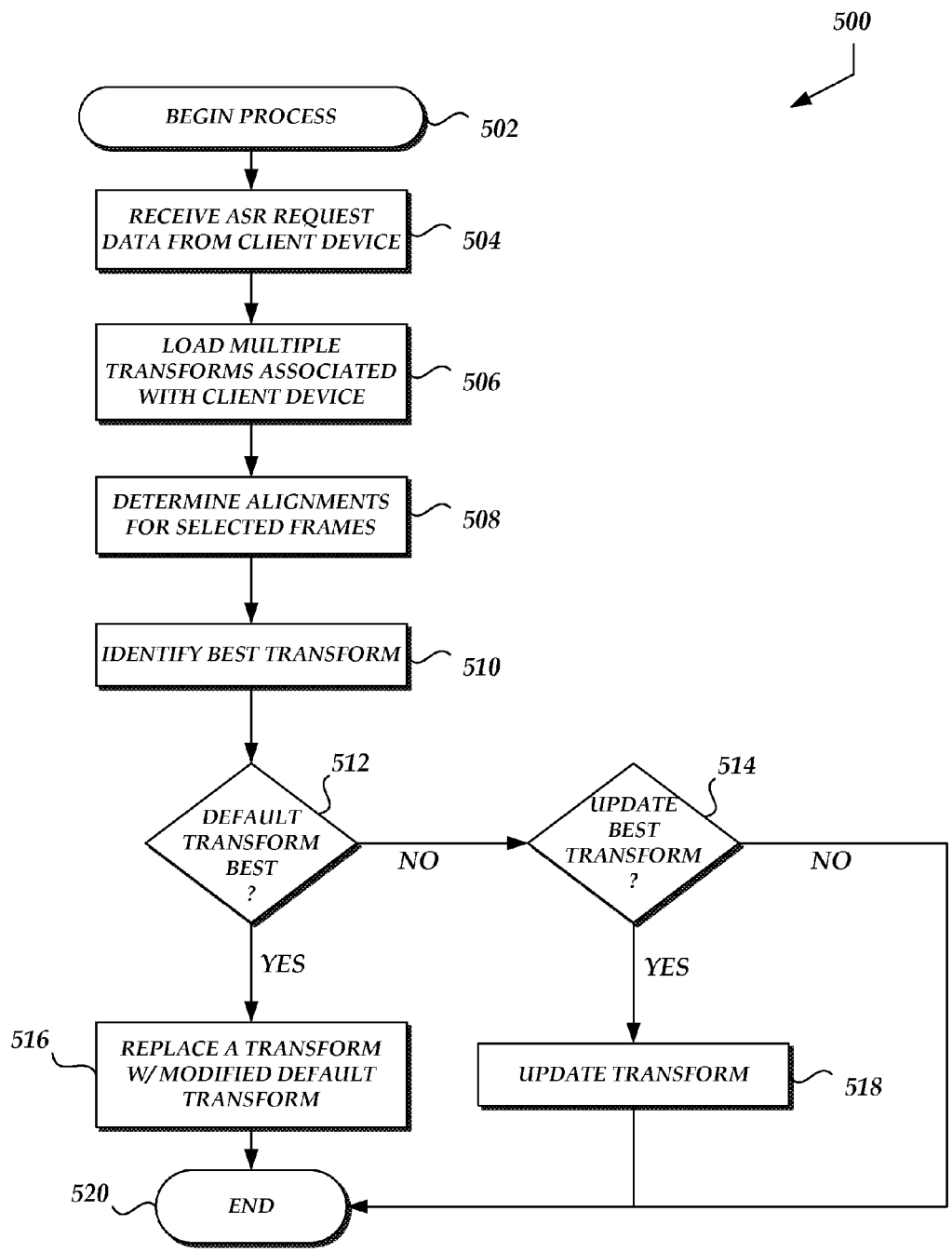
FIG. 5 is a flow diagram of an illustrative process for selecting, using, and modifying a transform for processing a user utterance.
Figure 6:
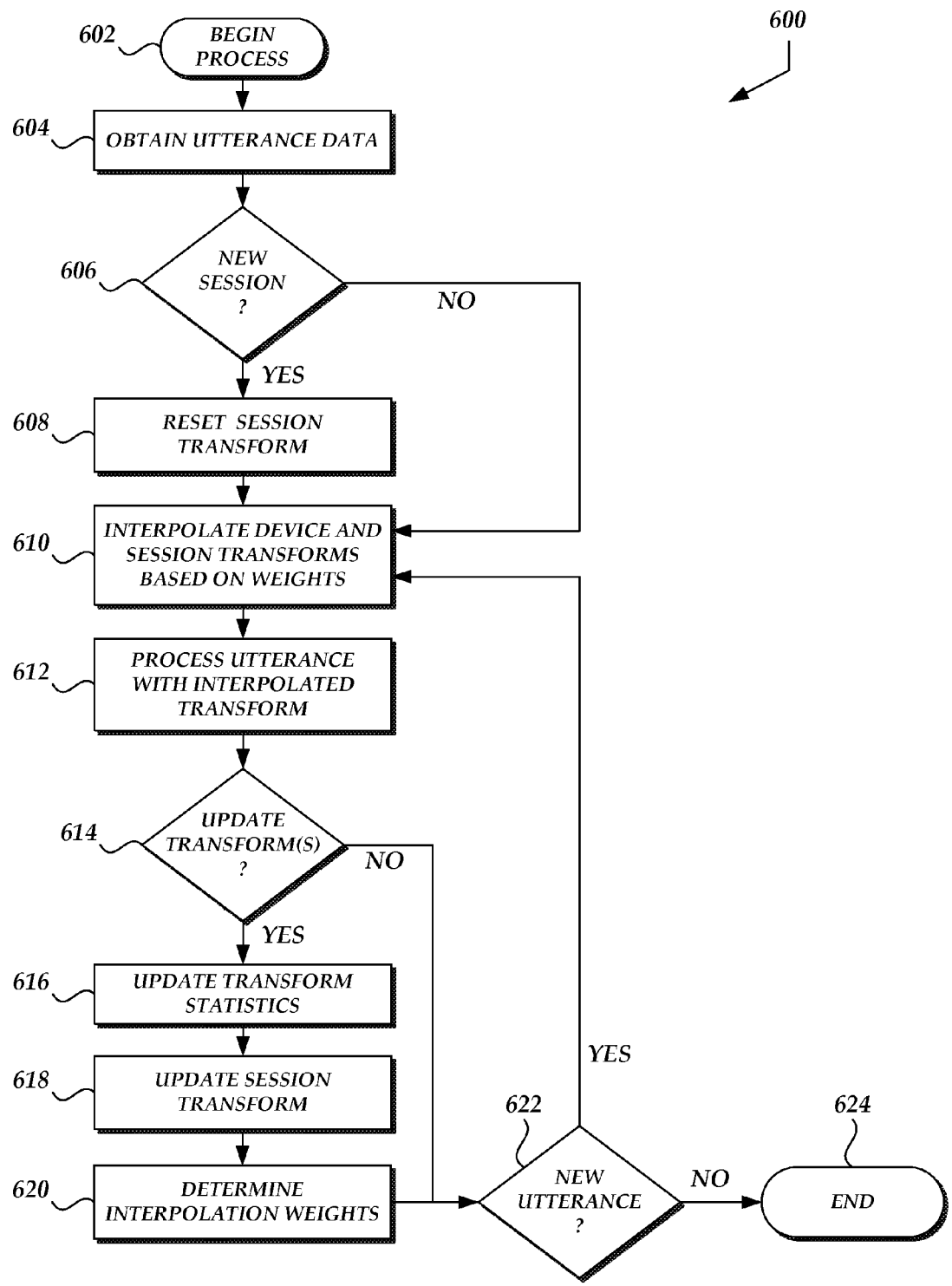
FIG. 6 is a flow diagram of an illustrative process for weighting multiple transforms, interpolating the transforms according to the weights, and using the interpolated transforms to process a user utterance.

At block 406, the ASR module 102 or some other module or component can determine which transform or transforms to use when processing the utterance. FIGS. 5-6 describe example processes for selecting and using transforms according to some embodiments. For example, FIG. 5 describes a process for selecting and using a particular transform from multiple available transforms. FIG. 6 describes a process for interpolating and using multiple transforms. The transform that is selected or interpolated in block 406 may be referred to simply as the selected transform.

At block 408, the ASR module 102 can perform ASR with the selected transform from block 406. Generally described, an acoustic model may be used to generate hypotheses regarding which subword units (e.g., phonemes) correspond to transformed feature vectors computed from frames of utterance audio data. The specific transforms applied to the feature vectors may be computed such that the transformed feature vectors better correspond to an acoustic model (e.g., the transformed feature vectors map to the underlying acoustic model with higher likelihood scores).

Illustratively, the ASR module 102 may perform a speech processing pass using the selected transform. During the ASR pass, the ASR module 102 can apply the selected transform to the feature vectors. The ASR module 102 may then proceed to generate a transcript or n-best transcripts of the utterance.

At block 410, the ASR module 102 or some other module or component can update transform statistics based on the ASR processing results. For example, audio frame x may correspond to a particular phoneme or triphone y of the generated transcript, and the original feature vector (e.g., the untransformed feature vector) for frame x can be compared to phoneme or triphone model y. Any mismatch between the feature vector for frame x and model y can be observed. cMLLR statistics can be updated, and based on those statistics a transform can be generated that nudges the feature vector for frame x closer to model y. In some embodiments, the transform may be generated from an aggregate of frames and models. Block 410 may be performed as part of block 408 (e.g., it may be performed during ASR processing of the utterance rather than as a separate, subsequent process).

The spoken language processing system 100 may maintain multiple distinct sets of cMLLR statistics, and each transform can be generated or modified based on one or more of the distinct sets. Therefore, the ASR module 102 may first select the appropriate set of statistics to update (e.g., the statistics that correspond to the selected transform or to some other transform or group of transforms), and then update those statistics based on the processing results.

At block 412, the ASR module can update the transform or transform(s) that correspond to the set or sets of cMLLR statistics that were updated in block 410. The updated transforms may be stored for future processing and/or transmitted to the client device 200.

Process for Selecting Transforms and Replacing Old Transforms

With reference now to FIG. 5, a sample process 500 for selecting, using, and updating a particular transform of multiple customized transforms associated with a client device 200 will be described. Advantageously, one or more default transforms may also be available for use. A default transform may be a general transform that can be used for any number of client devices 200, a set of general transforms targeted at different groups or user characteristics (e.g., a male transform and a female transform), etc. In some embodiments, the performance of the device-specific transforms may be compared to the results obtained from using no transform. In such cases, the default transform may be an identity transform or no transform. If a default transform is determined to be better for processing one or more utterances, then the least-recently-used transform associated with the client device 200 can be discarded and replaced by a modified version of a default transform. The total number of customized transforms associated with a device may be based on any number of factors. In some embodiments, retaining a small number of transforms (e.g., 3, 4 or 5) may provide a satisfactory or desired range of customization when weighted against the computing and/or storage requirements for retaining a larger number of transforms.

The process 500 begins at block 502. The process 500 may begin automatically upon receipt of audio input by a spoken language processing system 100. The process 500 may be embodied in a set of executable program instructions stored on a computer-readable medium, such as one or more disk drives, of a computing device of the spoken language processing system 100. When the process 500 is initiated, the executable program instructions can be loaded into memory of a computing device and executed by one or more processors in communication therewith.

At block 504, the ASR module 102 or some other module or component of the spoken language processing system 100 may receive ASR request data from a client device 200. The ASR request data may include audio data of a wake word, a spoken command, and/or some other user utterance. In some embodiments, as described above, the ASR request data from the client device 200 may include other data, such as alignments, indexes, transforms, and the like. In some embodiments, the process 500 may be used with no wake word (e.g., a user pushes a button prior to issuing a spoken command, rather than speaking a wake word). In such cases, the remaining steps of the process 500 may substitute some portion of an utterance (e.g., about the first 0.5 seconds, 1 second, etc.) for the wake word when identifying a transform to use.

At block 506, the ASR module 102 or some other module or component can load multiple transforms associated with the client device 200 from which the ASR request was received. Illustratively, the data store 108 may store transforms for any number of client devices 200 along with information that can be used to retrieve those transforms associated with a particular client device 200. The ASR module 102 may load all transforms for processing, or it may load only a subset based on data received from the client device 200, as described above.

At blocks 508 and 510, the ASR module 102 or some other module or component can identify the transform associated with the client device 200, or a general default transform, that provides the best results for the current utterance or a portion thereof. For example, the ASR module 102 can determine alignments for some portion of the frames of input data at block 508. This can be done prior to performing ASR on the full user utterance, such as by aligning frames of a wake word with a transcript of the wake word according to data received from the client device 200. In some embodiments, a first ASR pass (e.g., using channel normalization) may be performed on the wake word, on the full utterance, or on some portion thereof in order to generate a transcript and alignments.

In some embodiments, the ASR module 102 may apply each transform associated with the client device 200, or some subset thereof, to the input frames. For example, the ASR module 102 may, in separate parallel processes to reduce total processing time, apply each transform to feature vectors generated based on the input frames in order to produce transformed feature vectors. In addition to the particular transforms associated with the client device 200, the ASR module 102 may also apply a default or general transform for comparison (e.g., a default transform may be applied to feature vectors to produce default feature vectors).

At block 510 the ASR module 102 can identify the best performing transform. The best performing transform may be the transform with the highest performance score based on a comparison of the feature vectors, as transformed by each transform, to an acoustic model (e.g., a Gaussian mixture model). For example, the best performing transform is the transform that was used to transform those feature vectors that correspond most closely to the correct Gaussians (e.g., those feature vectors that have the highest likelihood over the Gaussians aligned to each frame based on the transcript/alignment generated from the first recognition pass). In some embodiments, the best performing transform may be the transform that maximizes the cMLLR objective function for the current frames of audio data. In some embodiments, a full ASR recognition may be performed, and the best performing likelihood may be identified by analyzing confidence scores associated with the full ASR recognition.

In some embodiments, the processing of blocks 508 and 510 may be performed in conjunction with ASR processing of the utterance, rather than on a wake word and associated data. In such cases, the utterance may be processed in parallel with each transform. In some embodiments, the processing of blocks 508 and 510 may be performed subsequent to ASR processing of the utterance. For example, an offline or asynchronous process may be run to identify the best transform and update the transform so that it may be used to process subsequent utterances.

At decision block 512, the ASR module 102 or some other module or component can determine whether the default transform was the best performing transform. If so, the process 500 may proceed to block 516, described below. Otherwise, the process 500 may proceed to decision block 514.

At block 516, the default transform may be updated based on the current processing results (e.g., by using cMLLR statistics from the ASR processing of the current utterance). A transform associated with the client device 500 may be replaced by the updated default transform based upon the application of some algorithm or an analysis of various factors to identify the transform or transforms to be discarded or replaced. For example, the least-recently used transform, may be discarded and replaced by the updated default transform. In some embodiments, the least-used transform associated with the client device 200 may be replaced by the updated default transform, even if the least-used transform was not the least-recently-used transform. Illustratively, the data store 108 may include data regarding how recently each transform associated with the client device 200 was used, how often it is used, etc. The ASR module 102 or some other module or component may use such data when making the determination regarding which transform to replace. In some embodiments, a threshold number of utterances must be processed by the default transform before a device-specific transform is replaced.

At decision block 514, the ASR module 102 can determine whether to update the best performing transform or multiple transforms (e.g., by using cMLLR statistics from the ASR processing of the current utterance). In order to make such a determination, the ASR module 102 may inspect an argument or other data received from downstream processes that consume ASR results or monitor user experience. If the user experience with the current or recent ASR results generated based on the transform is not satisfactory, then the ASR module 102 may be notified not to update the transform with the results of such unsatisfactory processing. For example, if a spoken utterance was made in an exceptionally noisy environment, ASR results and subsequent processing that relies upon those results may be less than satisfactory. In such circumstances, the ASR module 102 should not update the transform based on those results, because doing so may reduce the effectiveness of the transform. In some embodiments, user experience information may be used to determine by how much to modify a transform. For example, if user experience information indicates that processing of the utterance was not entirely satisfactory, the transform may still be updated. Any such updates may be partial updates or otherwise weighted less than would otherwise be the case, based on the user experience information.

In some embodiments, confidence scores or signal to noise ratios ("SNR") may be used instead of, or in addition to, user experience data to determine whether to update a transform. For example, the ASR module 102 may compute a confidence score for its recognition results. If the confidence score is below some threshold, then the ASR module 102 may choose not to update the transform based on processing of the utterance associated. Alternatively, if the confidence score is above some threshold, the ASR module 102 may choose to update the transform. As another example, if the SNR is above some threshold, the ASR module 102 may choose to update the transform. Alternatively, if the SNR is below some threshold, the ASR module 102 may choose not to update the transform.

If the transform is to be updated, the process 500 may proceed to block 518, where the transform is updated. Otherwise, if the transform is not to be updated, the process 500 may terminate at block 520.

Process for Interpolating Transforms

With reference now to FIG. 6, a sample process 600 for interpolating multiple transforms and using the interpolated transform for ASR processing will be described. With respect to the processes described herein, interpolation of multiple transforms may include interpolating the output of multiple transforms, or generating an interpolated transform. Advantageously, interpolation weights may be intelligently determined based on the amount of statistical data available, the results of prior processing passes, and the like. Multiple transforms may then be interpolated according to those intelligently determined weights and used for subsequent processing of an utterance (e.g., the output of multiple transforms may be interpolated based on the weights, or a new interpolated transform may be generated from the multiple transforms based on the weights).

The process 600 begins at block 602. The process 600 may begin automatically upon receipt of audio input by a spoken language processing system 100. The process 600 may be embodied in a set of executable program instructions stored on a computer-readable medium, such as one or more disk drives, of a computing device of the spoken language processing system 100. When the process 600 is initiated, the executable program instructions can be loaded into memory of a computing device and executed by one or more processors in communication therewith.

At block 604, the ASR module 102 or some other module or component of the spoken language processing system 100 may receive ASR request data from a client device 200. The ASR request data may include audio data of a user utterance.

At decision block 606, the ASR module 102 or some other module or component may determine whether the utterance is the first utterance of a new speech processing session, or whether it is related to a previously established session. The ASR module 102 may make such a determination based on, e.g., the elapsed time since the previously received utterance from the particular client device 200. If the time exceeds a threshold, or if the number of utterances received in a period of time fall below a threshold, then the current utterance may be determined to be the first utterance of a new session. In some embodiments, a session may be defined as a series of utterances within a short period of time under similar conditions. If the utterance is determined to be the first utterance of a new session, the process 600 can proceed to block 608. Otherwise, the process can proceed to block 610.

At block 608, the ASR module 102 or some other module or component may reset the short-term transform associated with the client device. For example, the ASR module 102 may discard the session transform for a prior session and initialize a new session transform for the client device 200 (e.g., initialize an identity transform). Because the current utterance is the first utterance of a new session, there is no reliable session transform to be used. Accordingly, one or more alternative thresholds will be used to process the utterance, such as a long-term transform based on a large number of utterances over the course of multiple sessions, also referred to as a device transform. In some embodiments, other transforms may be used, such as transforms based on time frames between a session and long-term device transform (e.g., daily or weekly transforms). These transforms may be interpolated with the device transform or used on their own.

At block 610, the ASR module 102 or some other module can interpolate multiple transforms according to interpolation weights. In some embodiments, as illustrated in FIG. 6 and described further below, the interpolation weights are predetermined based on the results of prior processing. They may be overridden during any given execution of the process 600, such as when the process 600 is executed for a new session, as described above. In some embodiments, interpolation weights are not generated or maintained, and the various transforms are interpolated without weights (or with equal weights).

Rather than selecting a particular transform associated with the client device 200, the ASR module 102 may interpolate the transforms by selecting a transform along the interpolation axis between the dynamic device and session transforms and/or any other transforms identified for use in the current ASR recognition (e.g., two or more of the device-specific transforms described above with respect to FIG. 5 may be interpolated instead of, or in addition to, the single-session and multi-session device transforms). A transform may be selected based on the interpolation weights which maximize the cMLLR objective function for the currently accumulated frames of data.

At block 612, the ASR module 102 can process the utterance with the interpolated transform. In a 2-pass recognizer, the amount of data available to update the session transform may increase as processing of an utterance proceeds. Interpolation weights may be dynamically updated as described below in such systems, and a different interpolated transform (e.g., one weighted more toward the session transform) may be used for a later portion of the utterance than was used for an earlier portion of the same utterance. In a streaming 1-pass recognizer, the interpolation weights may remain the same throughout processing of a particular utterance, and may be updated afterwards, as described below, to be used for processing subsequent utterances.

At decision block 614, the ASR module 102 or some other module or component may determine whether the transforms should be updated, as described above with respect to FIG. 5. If so, the process 600 proceeds to block 616. Otherwise, the process 600 may proceed to decision block 622.

At blocks 616 and 618, transform statistics (e.g., cMLLR statistics) may be updated and the session transform (and, in some cases, other transforms such as the device transform or a multi-session transform) may be updated based on the current utterance processing. In some embodiments, the session transform may only be updated once a substantial amount of new data (e.g., >5% new data) with which to update the transform has been obtained since the last update of the session transform.

At block 620, the ASR module 102 or some other module or component can determine updated interpolation weights. The ASR module 102 may determine what the optimum or desired interpolation weights would have been for the current utterance, e.g., based on the cMLLR objective function. The optimization of interpolation weights can be determined by a binary/bracketed search between the interpolation values of 0 and 1. In some embodiments, the weights can be determined by gradient descent and evolutionary algorithms.

The ASR module 102 may set the interpolation weights to the optimum or desired weights determined above, or it may apply a more gradual update. For example, the interpolation weights may be adjusted only n % towards the optimum weights (wherein n is some integer) based on the current utterance. In some embodiments, the current utterance must exceed some threshold length (e.g., 0.5 seconds) in order to serve as the basis for updating the interpolation weights. As a result of this gradual adjustment, there may be a smooth transition between interpolation weights favoring a device transform when little or no recent utterances or data have been processed, to a session transform that becomes increasingly effective as more recent data is observed.

At decision block 622, the ASR module 102 or some other module or component can determine whether a new utterance in the current session has been received. If so, the process 600 can return to block 610 where the utterance can be processed with the updated interpolation weights.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
      receive, from a client device, audio data regarding a user utterance;
      obtain, based at least partly on the audio data, at least a first transform and a second transform of a plurality of feature vector transforms associated with the client device;
      generate a plurality of feature vectors based at least partly on the audio data;
      apply the first transform, the second transform, and a default transform to at least a portion of the plurality of feature vectors to generate first transformed feature vectors, second transformed feature vectors, and default feature vectors respectively;
      determine, based at least partly on a performance score, that the default feature vectors provide a better match to an acoustic model than the first transformed feature vectors and the second transformed feature vectors; and
      discard at least one of the first transform or the second transform and create a new transform, the new transform based at least partly on the default transform and speech recognition statistics regarding a speech recognition pass using the default transform, wherein the new transform is associated with the client device.

2. The system of claim 1, wherein the one or more processors are further programmed to:
   determine, based at least partly on a performance score, that the first transformed feature vectors provide a better match to the acoustic model than the second transformed feature vectors and the default feature vectors; and
   modify the first transform based at least partly on speech recognition statistics regarding a speech recognition pass using the first transform.

3. The system of claim 2, wherein the one or more processors are further programmed to determine whether to modify the first transform based at least partly on data regarding a reliability of speech recognition results from the speech recognition pass using the first transform.

4. The system of claim 1, wherein the default transform comprises at least one of a general transform, a transform for males, a transform for females, or an identity transform.

5. A computer-implemented method comprising:
   receiving, by a spoken language processing system comprising one or more computing devices, audio data regarding a user utterance, wherein the audio data is received from a client device separate from the one or more computing devices;
   determining, based at least partly on the audio data, to replace a session feature vector transform associated with the client device with a new feature vector transform, wherein the session feature vector transform is based on data generated during processing of prior audio data regarding one or more utterances, made prior to the user utterance, received from the client device within a threshold period of time;
   creating the new feature vector transform based at least partly on the audio data, wherein the new feature vector transform is associated with the client device; and
   performing speech recognition using the new feature vector transform.

6. The computer-implemented method of claim 5, further comprising receiving, from the client device, data regarding which feature vector transform of a plurality of feature vector transforms associated with the client device to use in performing speech recognition.

7. The computer-implemented method of claim 6, wherein the data regarding which feature vector transform to use comprises speech processing alignments associated with at least a portion of audio data.

8. The computer-implemented method of claim 5, further comprising receiving, from the client device, a plurality of feature vector transforms associated with the client device.

9. The computer-implemented method of claim 5, further comprising performing speaker adaptation on at least a portion of the audio data with two or more of a plurality of feature vector transforms associated with the client device.

10. The computer-implemented method of claim 9, further comprising performing speaker adaptation on at least a portion of the utterance audio data with a default transform.

11. The computer-implemented method of claim 10, further comprising determining that the default transform provides better speech recognition results than the two or more of the plurality of feature vector transforms based at least partly on the speaker adaptation performed with the default transform and the two or more of the plurality of feature vector transforms.

12. The computer-implemented method of claim 11, further comprising replacing a least-recently-used transform of the plurality of feature vector transforms with a modified version of the default transform.

13. The computer-implemented method of claim 5, further comprising determining whether to store an updated version of the new feature vector transform is based at least partly on a user experience associated with the speech recognition.

14. The computer-implemented method of claim 5, further comprising interpolating the new feature vector transform and a second transform associated with the client device according to interpolation weights, wherein the speech recognition is performed based at least partly on the interpolated new feature vector transform and second transform.

15. One or more non-transitory computer readable media comprising executable code that, when executed, cause one or more computing devices to perform a process comprising:
   receiving, by a spoken language processing system comprising one or more computing devices, audio data regarding a user utterance, wherein the audio data is received from a client device separate from the one or more computing devices;
   determining, based at least partly on the audio data, to replace a session feature vector transform associated with the client device with a new feature vector transform, wherein the session feature vector transform is based on data generated during processing of prior audio data regarding one or more utterances, made prior to the user utterance, received from the client device within a threshold period of time;

creating the new feature vector transform based at least partly on the audio data, wherein the new feature vector transform is associated with the client device; and performing speech recognition using the new feature vector transform.

16. The computer-implemented method of claim 5, further comprising:

performing first speech recognition on at least a portion of the audio data using the session feature vector transform;

performing second speech recognition on at least the portion of the audio data using a default transform;

determining that the default transform provides better speech recognition results than the session feature vector transform, wherein determining to replace the session feature vector transform with the new feature vector transform is based on determining that the default transform provides better speech recognition results than the session feature vector transform; and generating the new feature vector transform using the default transform.

17. The one or more non-transitory computer readable media of claim 15, wherein the process further comprises updating the new feature vector transform based at least partly on speech recognition statistics.

18. The one or more non-transitory computer readable media of claim 15, wherein the process further comprises receiving, from the client device, data regarding which feature vector transform of a plurality of feature vector transforms associated with the client device to use in performing speech recognition.

19. The one or more non-transitory computer readable media of claim 15, wherein the process further comprises receiving, from the client device, the session feature vector transform.

20. The one or more non-transitory computer readable media of claim 15, wherein the process further comprises performing parallel speaker adaptation on at least a portion of the audio data using the session feature vector transform associated with the client device and a default transform.

21. The one or more non-transitory computer readable media of claim 20, wherein determining to replace the session feature vector transform with the new feature vector transform comprises:

determining that the default transform provides better speech recognition results than the session feature vector transform, wherein the new feature vector transform comprises a modified version of the default transform.

22. The one or more non-transitory computer readable media of claim 15, wherein the process further comprises interpolating the new feature vector transform and a second transform associated with the client device according to interpolation weights, wherein the speech recognition is performed based at least partly on the interpolated new feature vector transform and second transform.

23. The one or more non-transitory computer readable media of claim 22, wherein the new feature vector transform comprises a session transform based on processing of utterances in a current session, and wherein the second transform comprises a multi-session transform based on processing of utterances in multiple sessions.

24. The one or more non-transitory computer readable media of claim 22, wherein the process further comprises updating the interpolation weights based at least partly on results obtained from performing speech processing on the utterance.

25. The one or more non-transitory computer readable media of claim 15, wherein the process further comprises determining whether to store an updated version of the new feature vector transform is based at least partly on a user experience associated with the speech recognition.

* * * * *